United States Patent [19]

Flick et al.

[11] 4,292,558
[45] Sep. 29, 1981

[54] SUPPORT STRUCTURE FOR DYNAMOELECTRIC MACHINE STATORS SPIRAL PANCAKE WINDING

[75] Inventors: Carl Flick, Pittsburgh; Sui-Chun Ying, Monroeville, both of Pa.

[73] Assignee: Westinghouse Electric Corp., Pittsburgh, Pa.

[21] Appl. No.: 66,732

[22] Filed: Aug. 15, 1979

[51] Int. Cl.$^3$ .............................................. H02K 1/00
[52] U.S. Cl. .................................... 310/194; 310/254; 310/179
[58] Field of Search ...................... 310/43, 45, 51, 179, 310/180, 184, 192, 193, 214, 198–208, 259, 260, 270

[56] References Cited

U.S. PATENT DOCUMENTS

| | | | |
|---|---|---|---|
| 3,324,322 | 6/1967 | Johns | 310/198 |
| 3,344,297 | 9/1967 | Bishop et al. | 310/194 X |
| 3,348,085 | 10/1967 | Coggeshall et al. | 310/194 X |
| 3,999,157 | 12/1976 | Philofsky et al. | 310/194 X |
| 4,130,769 | 12/1978 | Karube | 310/179 X |
| 4,151,433 | 4/1979 | Flick | 310/198 X |
| 4,164,672 | 8/1979 | Flick | 310/179 X |

FOREIGN PATENT DOCUMENTS 329670 5/1976 Austria .

OTHER PUBLICATIONS

Neue Lösungswege zum Entwurf großer Turbogeneratoren bis 2GVA, 60kV, by Von Gerhard Aichholzer, Eingelangt, 9-25-74.

*Primary Examiner*—Mark O. Budd
*Attorney, Agent, or Firm*—G. H. Telfer

[57] ABSTRACT

A support structure for unitizing coil turns into a single member and bracing each coil of a multi-coil stator dynamoelectric machine. Each stator coil includes several turns relatively concentrically disposed. Each coil turn constitutes two longitudinal conductor portions and two end turn conductor portions. One end turn portion serially connects two longitudinal portions and the remaining end turn portion serially connects one of the longitudinal portions with a longitudinal portion of a concentrically adjacent coil. Each coil preferably lies in a plane defined by a portion of a cylinder and the coils are disposed in a cylindrical arrangement having a longitudinal axis therethrough such that one longitudinal portion of the outermost coil turn lies along the outer radial extent of the cylindrical arrangement and the remaining longitudinal portion of the outermost coil turn lies radially nearer the longitudinal axis of the cylindrical arrangement. A rigid foundation member is situated in the plane of each coil within the concentrically innermost turn. Turns of each coil are structurally connected either directly to the foundation member or indirectly to the foundation member by being intermediately joined to a turn already joined to the foundation member. The concentric turns of each coil are separated by a predetermined distance through the use of interposed spacer members situated at desired axial and circumferential locations. Such coils present a spiral pancake appearance and are cooperatively disposed in the cylindrical arrangement between radially inner and outer supporting structures. Appropriately shaped wedges are disposed between selected coils and internal/external supporting members to account for the skewed or spiral manner in which each of the coils is arranged in the substantially cylindrical arrangement. Radial tie rods extending between the radially internal and external support members structurally integrate those members so as to insure structural integrity of the cylindrical arrangement. The radially external support member is preferably configured to extract load components from individual coil turns exposed at the cylindrical arrangement's outer periphery by either having radially inwardly directed struts extending between adjacent turns or having notches within which the radially outer conductor turns, when canted, are receivable.

7 Claims, 7 Drawing Figures

SUPPORT STRUCTURE FOR DYNAMOELECTRIC MACHINE STATORS SPIRAL PANCAKE WINDING

BACKGROUND OF THE INVENTION

1. Field of the Invention

This invention relates to support structures for dynamoelectric machine stator coils, and more particularly, to support structures for spiral pancake stator coils.

2. Description of the Prior Art

Air gap stator windings were developed and adapted for use in a variety of dynamoelectric machines including generators having a superconducting field winding. Spiral pancake stator winding configurations utilize individual coils which spiral outwardly from a radially inner stator boundary to a radially outer stator boundary. Such winding configuration has certain advantages and is particularly effective in providing radial and tangential securement for each of the electrical coils. Such windings are illustrated in Austrian Pat. No. 329,670 having an effective date of May 25, 1976, and U.S. Pat. No. 4,151,433, issued Apr. 24, 1979 in the name of Mr. C. Flick and assigned to the Electric Power Research Institute. In addition to the relative coil disposition in the spiral pancake stator winding the latter patent application illustrates a liquid cooling scheme particularly adapted to such spiral pancake winding.

Through a series of wedges distributed adjacent the coils and interposed between radially inner and outer structural members, the coils, as separate units, were effectively mechanically supported. Individual coil sides or turns are serially connected and concentrically arranged to form the coils. Such individual coil turns are sometimes subjected to continuous vibration in addition to high electromagnetic forces during fault condition operation. Exposure of individual coils to such forces necessitate uniform support for each of the coils as a unit and for each of the coil turns individually. In section 3 of an article entitled "New Solutions For The Design Of Large Turbo Generators Up To 2GVA, 60KV" by Aichholzer, Eingelangt, 9-25-74, the following was included: . . . "the naturally occurring space in the center of each concentric pancake coil can be partially filled with ferromagnetic material, which leads to a reduction of the effective gap and thus to reduced excitation requirements." As stated, the ferromagnetic material was disposed in the center of each pancake coil in an unspecified manner so as to reduce excitation requirements. Forming the coils of a stator winding into a monolithic structure by injecting impregnating and bonding resins thereamong has also been suggested for stiffening the coils and supporting individual conductor turns. While such resins may, under appropriate circumstances, effectively brace the individual coil turns, monolithic structures subjected to extended service in dynamoelectric machines having high mechanical and electromagnetic force levels have not proven highly successful.

SUMMARY OF THE INVENTION

In accordance with the present invention an improved dynamoelectric machine is provided in which individual turns of each coil in a stator winding are structurally integrated with other coil turns of the same coil to effectively resist local displacement and vibration thereof induced by mechanical and electromagnetic forces. The invention generally comprises a frame and a stator structure supported in the frame with the stator structure including a plurality of electrical coils each of which has a plurality of concentric turns, foundation means situated within the concentrically innermost turn of each coil for structurally supporting the turns, and means for structurally connecting the electrical conductor turns of each coil with the supporting foundation means of each coil. Each coil lies in a plane which generally spirals outwardly about a longitudinal axis extending through the stator structure. The foundation means of each coil preferably comprises a support member lying in a curved plane corresponding to the spiral shape of the associated coil. The structural connecting means preferably includes a series of bands in engagement with the conductor turns and the support member. An additional series of bands preferably engage two conductor turns on circumferentially opposite sides of the turns. Means are provided for maintaining a predetermined separation between adjacent turns of the same coil. In a preferred embodiment of the present invention support means are provided for structurally integrating internal and external support means relative to the interposed stator coils. Means are also provided for extracting from each coil turn a component of load transmitted through the coil.

BRIEF DESCRIPTION THE DRAWINGS

The invention will be more fully understood from the following detailed description of a preferred embodiment, taken in connection with the accompanying drawings, in which.

DESCRIPTION OF THE PREFERRED EMBODIMENT

The present invention is concerned primarily with structurally integrating individual coil turns of each stator coil in a dynamoelectric machine so as to reduce internal stresses and local displacements induced by mechanical vibration and electromagnetic forces. Accordingly, in the description which follows, the invention is shown embodied as a large tubine generator.

Figure 1:
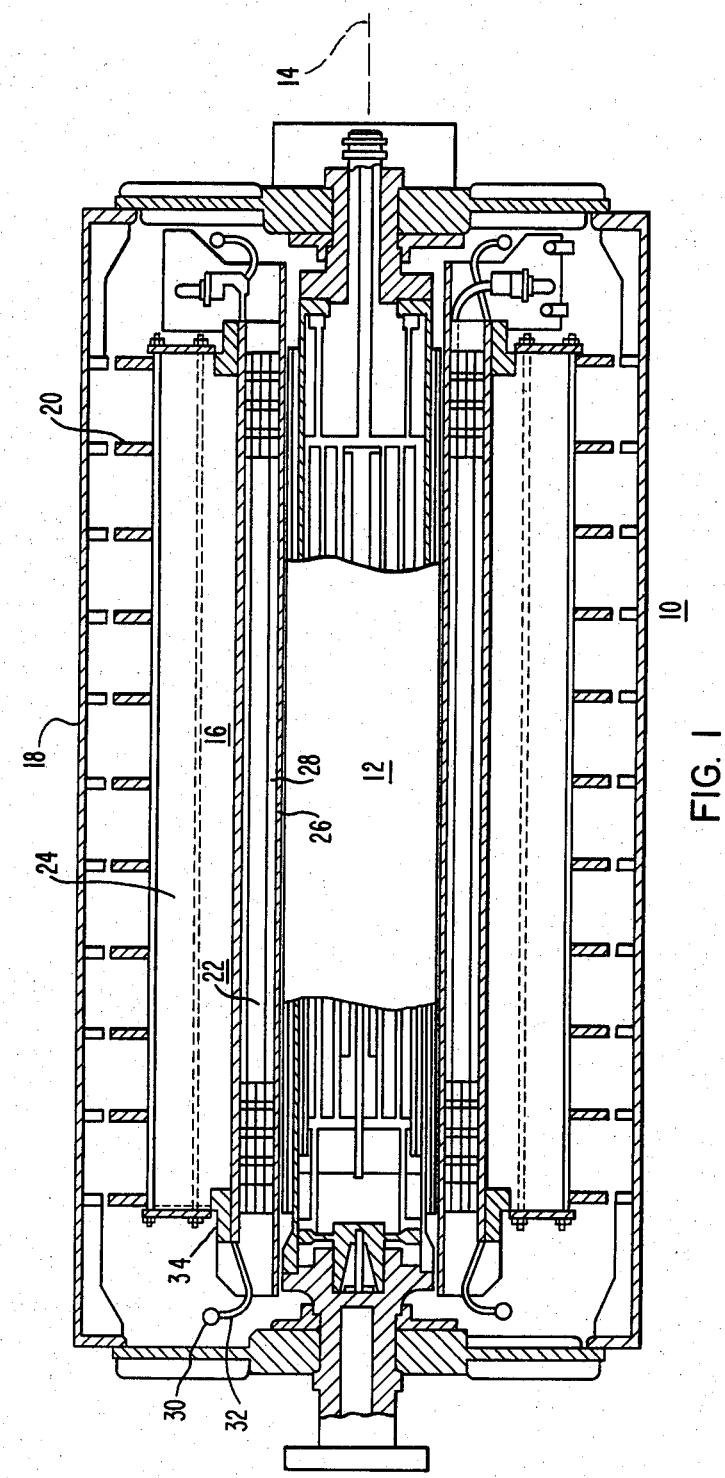
FIG. 1 is a transverse sectional view of an exemplary turbine generator.

FIG. 1 illustrates turbine generator 10 which includes rotor 12 which is rotatable about longitudinal axis 14, stator structure 16, and frame structure 18. Stator structure 16 is disposed about rotor 12 and is structurally connected to frame structure 18 through radially projecting ribs 20. Stator structure 16 constitutes stator winding 22, flux shield 24, and internal support tubes 26 and 28. Although two internal support tubes are illustrated, it is to be understood that any number may be used will equal facility with the present invention.

Coolant is transmitted from inlet manifold 30 through suitable conduits 32 and into water connection headers 34 which are in fluid communication with internal cooling passages disposed within stator winding 22. The coolant headers 34 and their relative disposition within stator structure 16 are best illustrated in FIG. 2.

Figure 2:
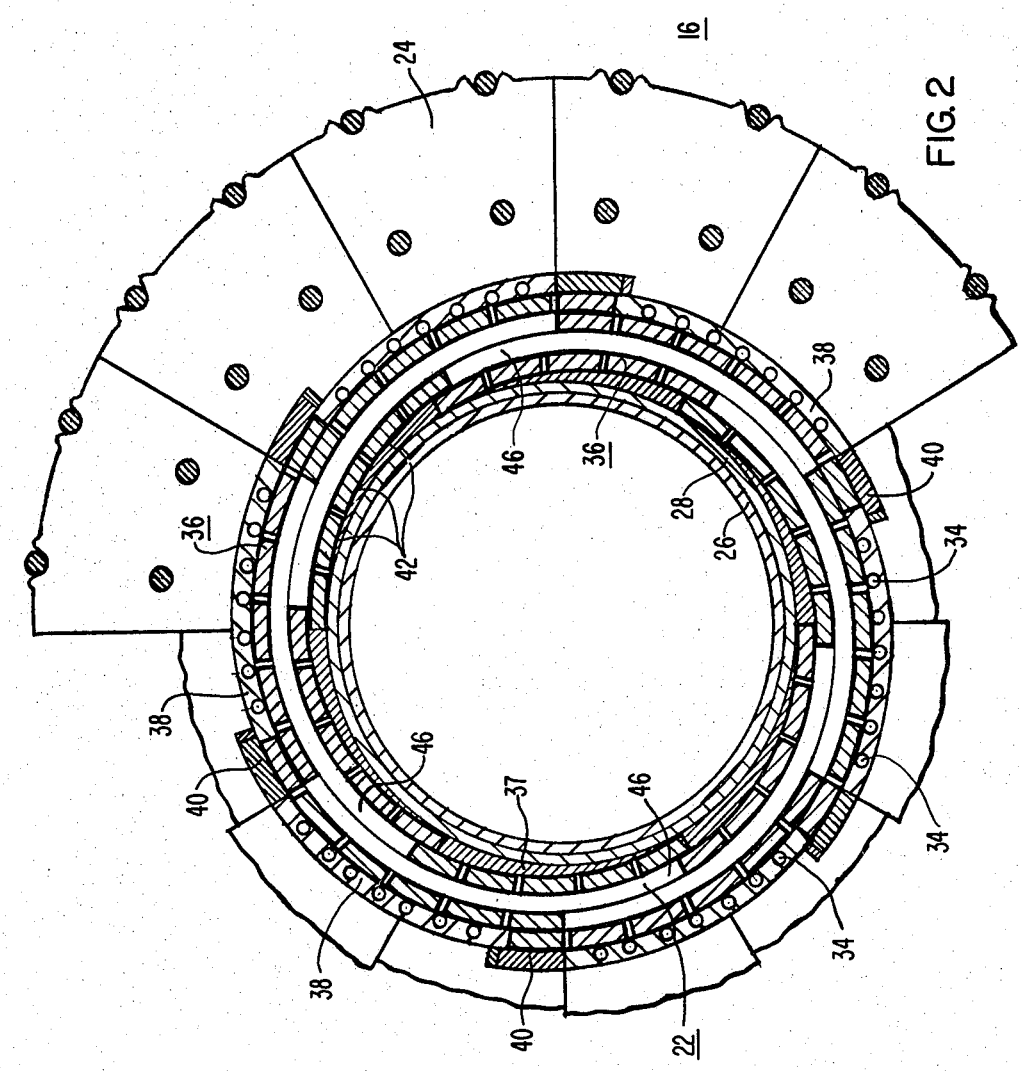
FIG. 2 is an axial sectional view of the turbine generator of FIG. 1.

An expanded axial end view of FIG. 1's stator structure 16 is illustrated in FIG. 2 and is substantially cylindrical in shape. Radially internal support tubes 26 and 28 preferably constitute glass fiber reinforced epoxy such as Micarta material and define a radially inner boundary for stator winding 22. Flux shield 24 generally includes a plurality of thin plates or laminae which are approximately 1/50th of an inch in thickness and by example constitute magnetic material such as silicon iron. Flux shield 24 functions both as a radially external support means for stator winding 22 and flux constraint for channeling magnetic flux emanating from a field winding back to the field winding disposed, in the case of the illustrated generator, on rotor 12. Stator winding 22 includes a plurality (six in this case) of coils 36 which spiral radially outwardly from the support tubes 26 and 28 to protective members 38 which preferably constitute laminated glass fiber reinforced epoxy. Laminate protective members 38 are disposed radially between coils 36 and flux shield 24 and are secured in position by longitudinally tapered wedges 40. Protective members 38, which constitute a portion of the radially external support means, are interposed between coils 36 and flux shield 24 to protectively buffer the coils and to prevent coil damage by the flux shield laminations 24 during insertion and assembly of the coils 36 within the flux shield 24.

Figure 3:
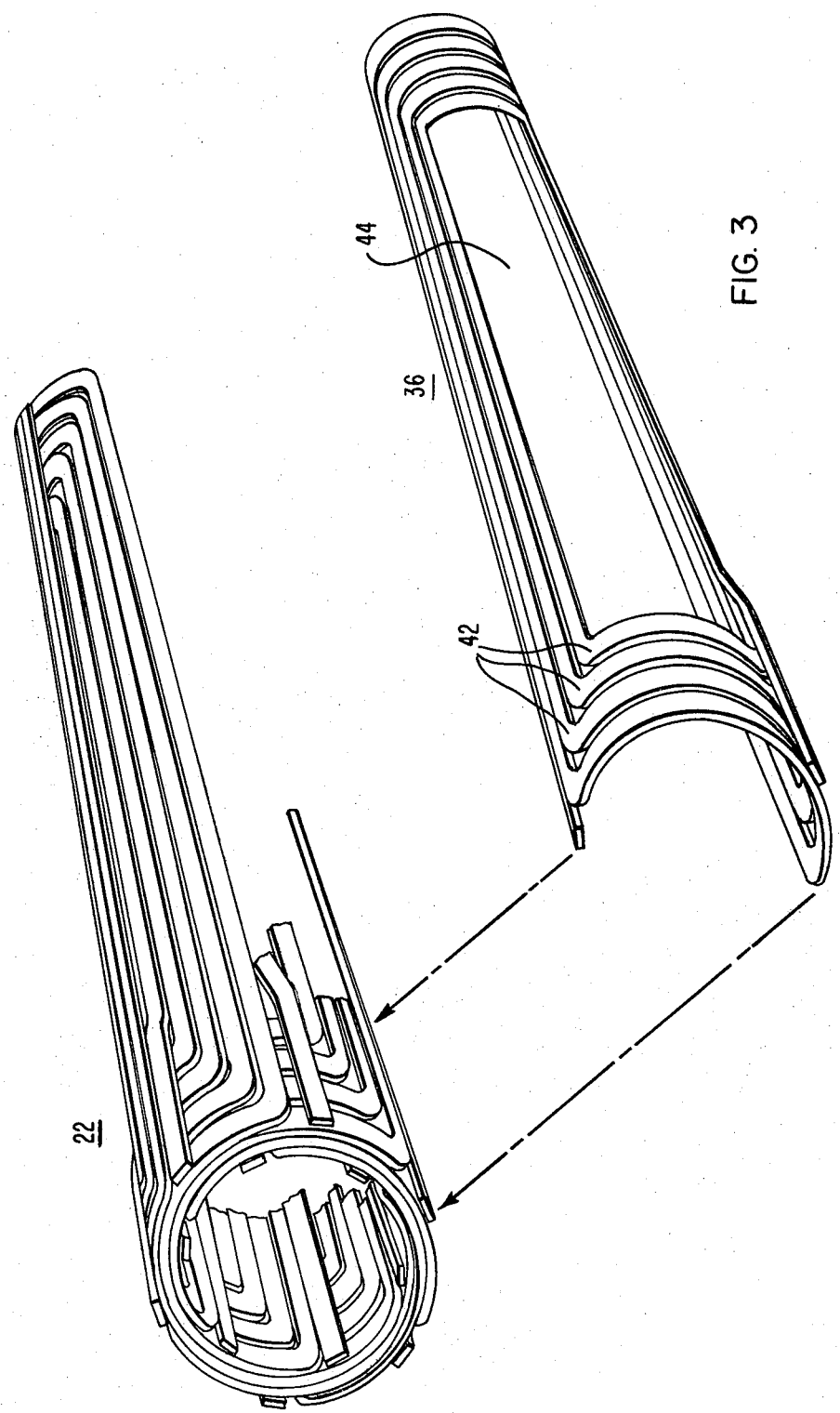
FIG. 3 is a perspective view of the relative disposition of coils in the turbine generator's stator.
Figure 4:
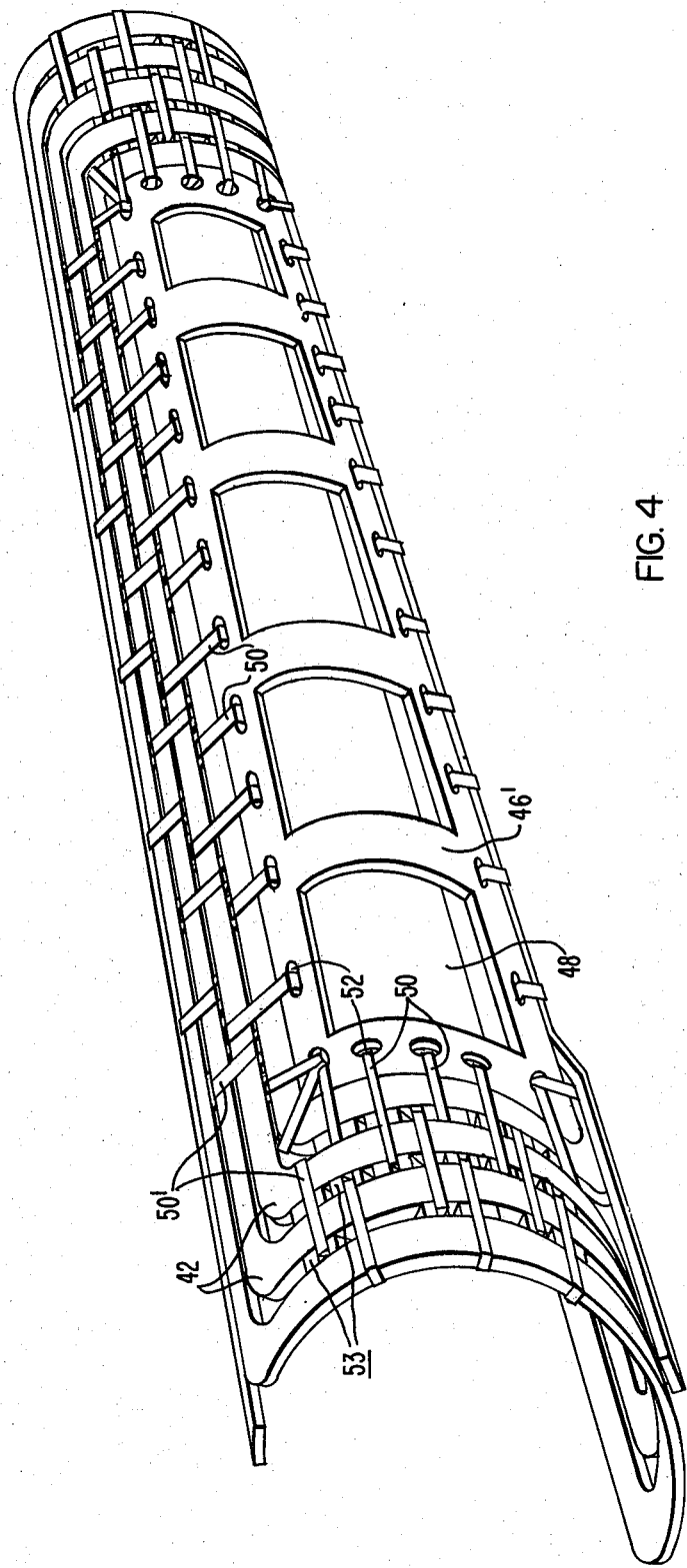
FIG. 4 is a perspective view of a coil illustrated in FIG. 3 and a support scheme for integrating individual coil turns into a rigid coil structure.

Each stator coil 36 has a spiral pancake configuration and comprises a plurality (illustrated as five) of concentrically disposed, serially connected coil turns 42 which constitute interconnected longitudinal and end turn portions. Since the number of coil turns 42 is primarily related to the voltage in the coils, it is to be understood that any number of coil turns could be used (instead of the illustrated five) with the present invention. Stator winding 22 and its included stator coils 36 are better illustrated in FIG. 3 which provides an exploded perspective view thereof. The concentrically innermost turn 42 bounds an opening or coil window 44. Rigid foundation means is disposed in each coil window 44 to provide an anchoring structural support for the conductor turns of each coil 36. Such foundation means preferably constitute glass fiber reinforced epoxy impregnated laminated material that may be pressed and cured to the proper contour to conform to the basic spiral geometry of the coils 36. FIG. 2 illustrates solid foundation means or strongback 46, but ladder structure strongback 46', as illustrated in FIG. 4, is an acceptable substitute therefor. Design constraints such as the magnitude of the electromagnetic forces experienced by the coils may dictate the percentage of open area 48 of strongback 46'. Strongbacks 46 and 46' lie in curved planes and have thicknesses perpendicular to the curved planes not greater than the thickness of coil turns 42 which lie coplanar therewith.

As shown in FIG. 4, structural connecting means such as bands 50 structurally connect coil turns 42 with strongback 46' at desired axial and circumferential locations. Bands 50 preferably protrude through openings 52 formed in strongback 46' and extend to the circumferentially and axially remote sides (relative to strongback 46') of the longitudinal and end turn portions respectively of the individual coil turns 42. A second set of structural connecting bands 50' are disposed so as to structurally connect relatively inner and outer concentric coil turns 42. Such structural connection of concentric coil turns 42 to one another is sometimes necessary to avoid connection interference problems such as spacial constraints where bands 50 are joined to strongback 46'. In other words, if each coil turn 42 were directly structurally connected to strongback 46' then connecting bands 50 may be of such substantial number as to interfere with each other at their connection with strongback 46'. Additionally, if the illustrated connecting technique (openings 52) with strongback 46' were utilized, strongback 46' could weaken and lose the rigidity necessary to structurally support the individual coil turns 42.

Separating means such as conformable spacer blocks 53 are disposed between adjacent coil turns 42 at desired axial and circumferential locations between longitudinal and end turn portions, respectively, to maintain predetermined spacial relationships therebetween. Spacer blocks 53, when used in combination with bands 50 and 50', enable effective securement and structural integration of the coil turns 42 into a single coil unit which is highly resistant to vibration and can be readily supported as an entirety. Spacer blocks 53 also prevent rubbing between adjacent coil turns 42 and so avoid damage resulting therefrom.

Figure 5:
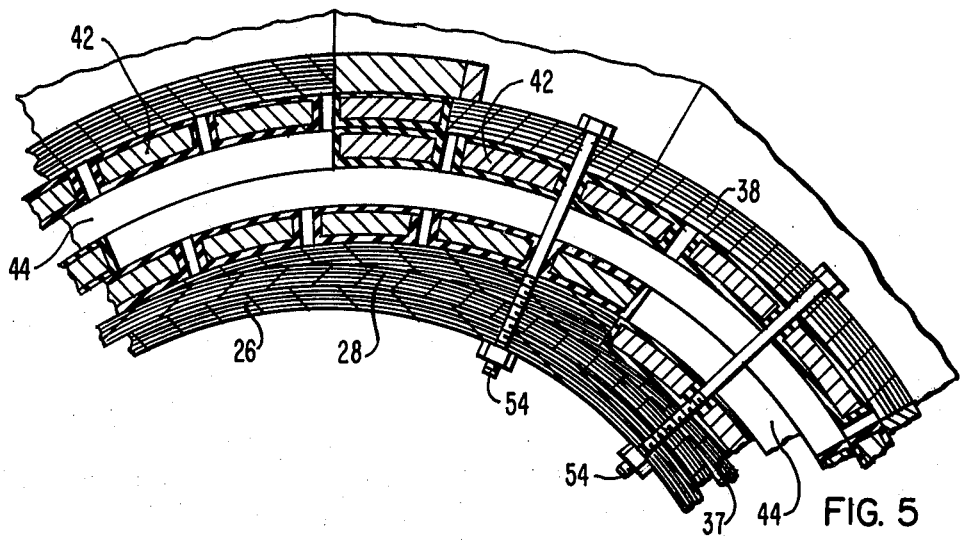
FIG. 5 illustrates a portion of FIG. 2 and includes means for radially integrating support structures associated with stator coils.

FIG. 5 is a cut away axial view of a portion of stator 16. Radial structural integration means such as rods 54 interconnect the radially internal and external support means for stator winding 22 so as to provide additional rigidity and augment the mechanical strength of the internal support tubes 26 and 28. Radially disposed rods 54 extend radially across the illustrated coil window 44. Strongback 46 and 46' have been removed from FIG. 5 to provide greater clarity, but it is to be understood that such radial support rods 54 could protrude through openings in those strongbacks.

Figure 6:
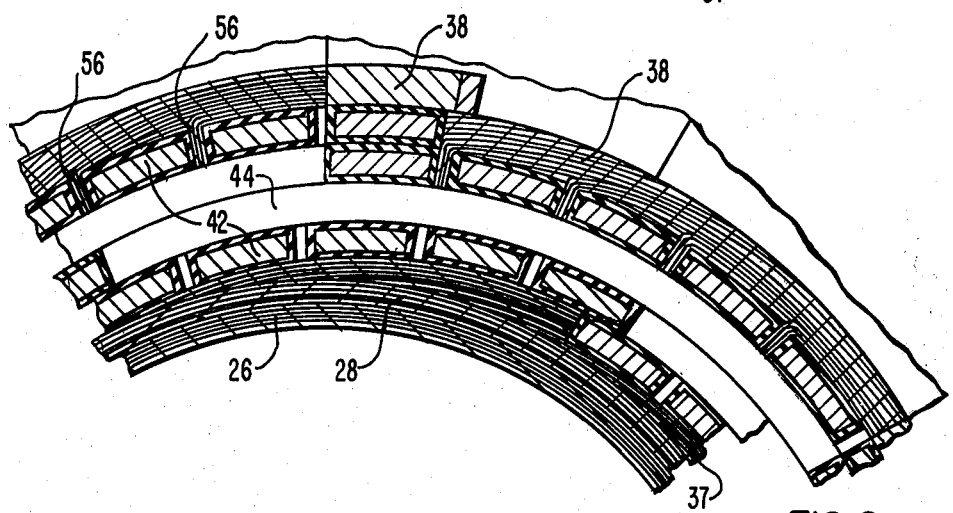
FIGS. 6 and 7 each illustrate a portion of the stator illustrated in FIG. 2 and exemplify means for transmitting load from individual coil turns to the radially integrating support structures.
Figure 7:
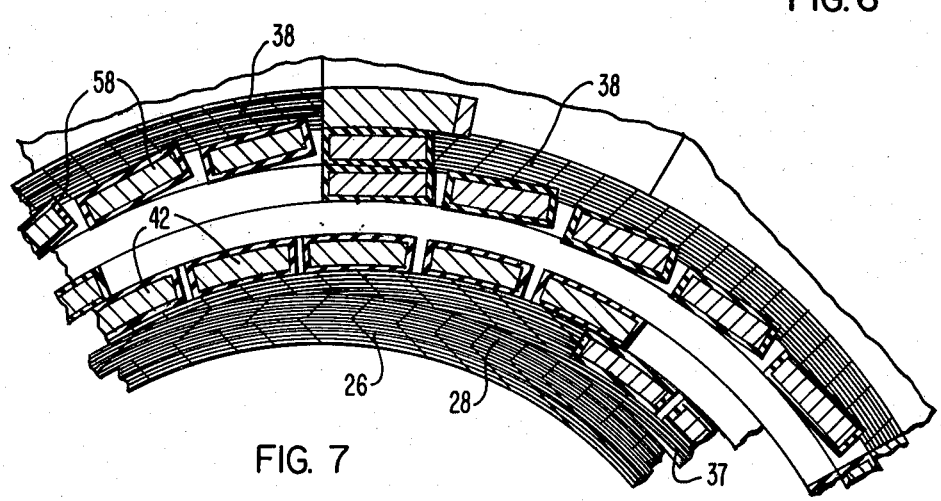

FIGS. 6 and 7 illustrate 60° segments of stator structure 16 and show alternative means for transmitting circumferential load components from coil turns 42 disposed radially adjacent laminate protective members 38. The scheme of FIG. 6 for transmitting load components from individual coil turns 42 includes a plurality of struts 56 which protrude substantially radially inwardly from the protective members 38 and pass between adjacent coil turns 42 such that circumferential forces exerted by and transmitted through coils 36 are transferred piecemeal through struts 56 to protective members 38 so as to avoid force accumulation and possible deformation of individual coil turns 42. The scheme of FIG. 7 for transmitting load from individual coil turns 42 to protective members 38 includes notches 58 formed in the radially inner surface of protective members 38 for receiving canted or angularly displaced coil turns 42 therein. As can be seen, coil turns 42 which are radially separated from protective members 38 are not canted so as to minimize the radial size of stator structure 16.

It will now be apparent that an improved dynamoelectric machine stator structure has been provided in which spiral pancake coils are securely supported and the individual coil turns thereof are structurally integrated to form a coil structure of substantial rigidity. Various configurations utilizing structurally integrated coils are also provided for preventing circumferential force accumulation and possible coil turn deformation by individually transmitting load from the various coil turns. As such, a stiffer stator winding having high resistance to vibration and electromagnetic displacement obtains.

What is claimed is:

1. A dynamoelectric machine comprising:
   a frame structure; and
   a substantially cylindrical stator structure having a longitudinal axis, said stator structure being supported by said frame, said stator structure comprising
      a plurality of electrical coils, each of which comprise an electrical conductor formed in a plurality of concentric turns which are serially electrically connected, said turns in each coil spiraling outwardly about the longitudinal axis,
      rigid foundation means, disposed within the concentrically innermost turn of each coil, for structurally supporting the turns of each coil, and comprising a support member lying in a curved plane which corresponds to the spiral shape of the associated coil, said member's plane thickness perpendicular to said spiral being less than or equal to said associated coil's conductor's thickness perpendicular to said spiral, and
      means for structurally connecting said turns of each coil with said supporting foundation means of each coil including a first plurality of bands protruding through said support member and in engagement with said turns, said engagement being on said turn's remote side relative to said support member, said bands being disposed at selected axial and circumferential locations.

2. A dynamoelectric machine in claim 1 further comprising:
   means for maintaining separation spaces between said turns of each coil.

3. The dynamoelectric machine in claim 2, said conductor turn separation means comprising:
   a plurality of blocks disposed between adjacent turns at selected axial and circumferential locations.

4. The dynamoelectric machine in claim 1, said structural connecting means further comprising:
   a second plurality of bands wherein each band provides securing engagement for two turns, said engagement being on opposite sides of said engaged turns.

5. A dynamoelectric machine comprising:
   a frame structure; and
   a substantially cylindrical stator structure having a longitudinal axis, said stator structure being supported by said frame, said stator structure comprising
      a plurality of electrical coils, each of which comprise an electrical conductor formed in a plurality of concentric turns which are serially electrically connected, said turns in each coil spiraling outwardly about the longitudinal axis,
      rigid foundation means disposed within the concentrically innermost turn of each coil for structurally supporting the turns of each coil,
      means for structurally connecting said turns of each coil with said supporting foundation means of each coil,
      means disposed radially inside said electrical coils for radially internally supporting said plurality of coils; and
      means disposed radially outside said electrical coils for radially externally supporting said plurality of coils comprising a plurality of struts supported by said radially external support means, said struts protruding substantially radially inwardly between adjacent turns for extracting load components from individual turns.

6. The dynamoelectric machine in claim 5 further comprising:
   intermediate support means for structurally integrating said radially internal and external support means, said integrating support means being radially disposed between said internal and external support means.

7. A dynamoelectric machine comprising:
   a frame structure; and
   a substantially cylindrical stator structure having a longitudinal axis, said stator structure being supported by said frame, said stator structure comprising
      a plurality of electrical coils, each of which comprise an electrical conductor formed in a plurality of concentric turns which are serially electrically connected, said turns in each coil spiraling outwardly about the longitudinal axis,
      rigid foundation means disposed within the concentrically innermost turn of each coil for structurally supporting the turns of each coil,
      means for structurally connecting said turns of each coil with said supporting foundation means of each coil,
      means disposed radially inside said electrical coils for radially internally supporting said plurality of coils; and
      means disposed radially outside said electrical coils for radially externally supporting said plurality of coils comprising wherein coil turns radially adjacent said external support means are canted so as to be receivable in notches on said radially adjacent external support means.

* * * * *